(12) United States Patent
Kurtovic et al.

(10) Patent No.: US 11,030,863 B2
(45) Date of Patent: Jun. 8, 2021

(54) SYSTEMS AND METHODS FOR PROVIDING AUDIO INFORMATION IN A VEHICLE

(71) Applicant: Toyota Motor Engineering & Manufacturing North America, Inc., Plano, TX (US)

(72) Inventors: Kenan Kurtovic, Troy, MI (US); Mark Addy, South Lyon, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 16/590,593

(22) Filed: Oct. 2, 2019

(65) Prior Publication Data

US 2021/0104134 A1 Apr. 8, 2021

(51) Int. Cl.
| | | |
|---|---|---|
| G08B 19/00 | (2006.01) | |
| G08B 3/10 | (2006.01) | |
| G08B 1/08 | (2006.01) | |
| B60W 50/14 | (2020.01) | |
| B60Q 5/00 | (2006.01) | |

(52) U.S. Cl.
CPC ............ *G08B 3/10* (2013.01); *B60Q 5/00* (2013.01); *B60W 50/14* (2013.01); *G08B 1/08* (2013.01); *B60W 2050/143* (2013.01)

(58) Field of Classification Search
CPC ......... B60Q 5/00; B60Q 5/008; B60W 50/14; B60W 2050/143; G10K 15/02; G08B 3/10; G08B 1/08
See application file for complete search history.

(56) References Cited

U.S. PATENT DOCUMENTS

| | | | |
|---|---|---|---|
| 4,015,237 A | | 3/1977 | Takatani et al. |
| 4,193,060 A | * | 3/1980 | Slavin ...................... B60Q 5/00 340/384.72 |
| 6,476,711 B2 | * | 11/2002 | Kitamura ............... G10K 15/02 340/384.1 |
| 6,693,523 B1 | | 2/2004 | Noll et al. |
| 8,730,020 B2 | | 5/2014 | Konet et al. |
| 2005/0043864 A1 | * | 2/2005 | Echtenkamp ....... B60R 16/0231 701/1 |
| 2006/0061586 A1 | | 3/2006 | Brulle-Drews et al. |

(Continued)

FOREIGN PATENT DOCUMENTS

| | | |
|---|---|---|
| DE | 102014218065 A1 | 3/2016 |
| GB | 2557178 A | 6/2018 |
| JP | 2016134662 A | 7/2016 |

OTHER PUBLICATIONS

International Search Report and Written Opinion for PCT/US2020/053968, dated Jan. 25, 2021, 10 pages.

*Primary Examiner* — Hongmin Fan
(74) *Attorney, Agent, or Firm* — Christopher G. Darrow; Darrow Mustafa PC (57) ABSTRACT

System, methods, and other embodiments described herein relate to providing audio information in a vehicle. In one embodiment, a method includes determining whether at least one vehicle alert is to be provided by the vehicle, and outputting, in response to determining that the at least one vehicle alert is to be provided, an audio signal for the at least one vehicle alert at a plurality of frequencies. The plurality of frequencies range from a predetermined minimum frequency value to a predetermined maximum frequency value.

17 Claims, 4 Drawing Sheets

(56) References Cited

U.S. PATENT DOCUMENTS

| | | |
|---|---|---|
| 2017/0291541 A1 | 10/2017 | Di Censo et al. |
| 2018/0170229 A1* | 6/2018 | Hashimoto ............. B60R 11/02 |
| 2019/0143904 A1 | 5/2019 | Hedebouw et al. |
| 2019/0231233 A1 | 8/2019 | Turner et al. |

* cited by examiner

SYSTEMS AND METHODS FOR PROVIDING AUDIO INFORMATION IN A VEHICLE

TECHNICAL FIELD

The subject matter described herein relates, in general, to vehicles and, more specifically, to systems and methods for providing audio information in a vehicle.

BACKGROUND

Many vehicles provide information using audio signals. These audio signals may be used to alert users (e.g., drivers or passengers) to an impending issue. For example, an audio signal may indicate that there is an object in the vehicle's blind spot, a vehicle door has not been properly closed, or a seatbelt has not been fastened.

However, a user that has experienced hearing loss or has a hearing impairment may be unable to hear an audio signal if the audio signal is set to a single frequency that falls outside the frequency range that is audible to the user.

SUMMARY

In one embodiment, a method for providing audio information in a vehicle is disclosed. In one embodiment, the method includes determining whether at least one vehicle alert is to be provided by the vehicle, and outputting, in response to determining that the at least one vehicle alert is to be provided, an audio signal for the at least one vehicle alert at a plurality of frequencies. The plurality of frequencies ranges from a predetermined minimum frequency value to a predetermined maximum frequency value.

In one embodiment, a system for providing audio information in a vehicle is disclosed. The system includes one or more audio devices. The system includes one or more processors and a memory communicably coupled to the one or more processors. The memory stores an alert determination module including instructions that when executed by the one or more processors cause the one or more processors to determine whether at least one vehicle alert is to be provided by the vehicle. The memory stores an audio output control module including instructions that when executed by the one or more processors cause the one or more processors to output, in response to determining that the at least one vehicle alert is to be provided, an audio signal for the at least one vehicle alert at a plurality of frequencies via the one or more audio devices. The plurality of frequencies ranges from a predetermined minimum frequency value to a predetermined maximum frequency value.

In one embodiment, a non-transitory computer-readable medium for providing audio information in a vehicle and including instructions that when executed by one or more processors cause the one or more processors to perform one or more functions is disclosed. The instructions include instructions to determine whether at least one vehicle alert is to be provided by the vehicle. The instructions further include instructions to output, in response to determining that the at least one vehicle alert is to be provided, an audio signal for the at least one vehicle alert at a plurality of frequencies. The plurality of frequencies ranges from a predetermined minimum frequency value to a predetermined maximum frequency value.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with providing audio information in a vehicle are disclosed. Passengers of a vehicle, which may include persons that are in or near the vehicle, may be unable to hear an audio warning provided by the vehicle if the passenger has a hearing impairment. Further, a passenger with a hearing impairment may be unable to hear sounds at specific frequencies.

Past methods to address this issue have included receiving information from each passenger, indicating a single frequency audible to the respective passenger, and outputting the audio warning at that single frequency. However, any passenger that did not provide information indicating a frequency audible to him or her may be excluded.

Example systems and methods disclosed herein relate to outputting audio signals related to vehicle alerts at a plurality of frequencies, so as to increase the chances of any passenger hearing the audio signals, whether or not the passenger has provided information about a frequency audible to him or her. When multiple passengers each have a hearing impairment, the systems and methods disclosed may reduce the chances of any of the passengers being excluded and unable to hear the audio signal.

In one approach, a system receives a vehicle alert provided by the vehicle, or more specifically, by a sensor system (e.g., vehicle sensors) or by a vehicle system (e.g., braking system, signaling system). Upon receiving the signal, the system may activate one or more audio devices to output an audio signal related to the vehicle alert at multiple frequencies. This includes the system determining which audio devices within the vehicle to activate, selecting a frequency range, selecting frequencies within that frequency range, selecting which audio device should output which frequency and for how long. One advantage of outputting the alert at multiple frequencies is that each passenger may hear the audio message. In other words, all passengers may benefit and no passengers are excluded.

In another approach, a system, upon receiving a signal of a vehicle alert, may select one or more audio devices and activate each of the one or more audio devices to output an audio signal at various frequencies in sequence over a period of time. The values of the frequencies in a sequence may increase during the time period. In other words, the one or more audio devices may start by outputting a first frequency that is at a minimum value, followed by successive frequencies, where each successive frequency is greater than the preceding frequencies and then end with a last frequency that is at a maximum value. Alternatively, the values of the frequencies in a sequence may decrease during the time period such that the one or more audio devices begin by outputting at the audio signal at the maximum frequency and continue to output the audio signal at subsequently decreasing frequency values until the minimum frequency value is reached. As another alternative, the audio device may output the audio signal in a random sequence.

Figure 1:
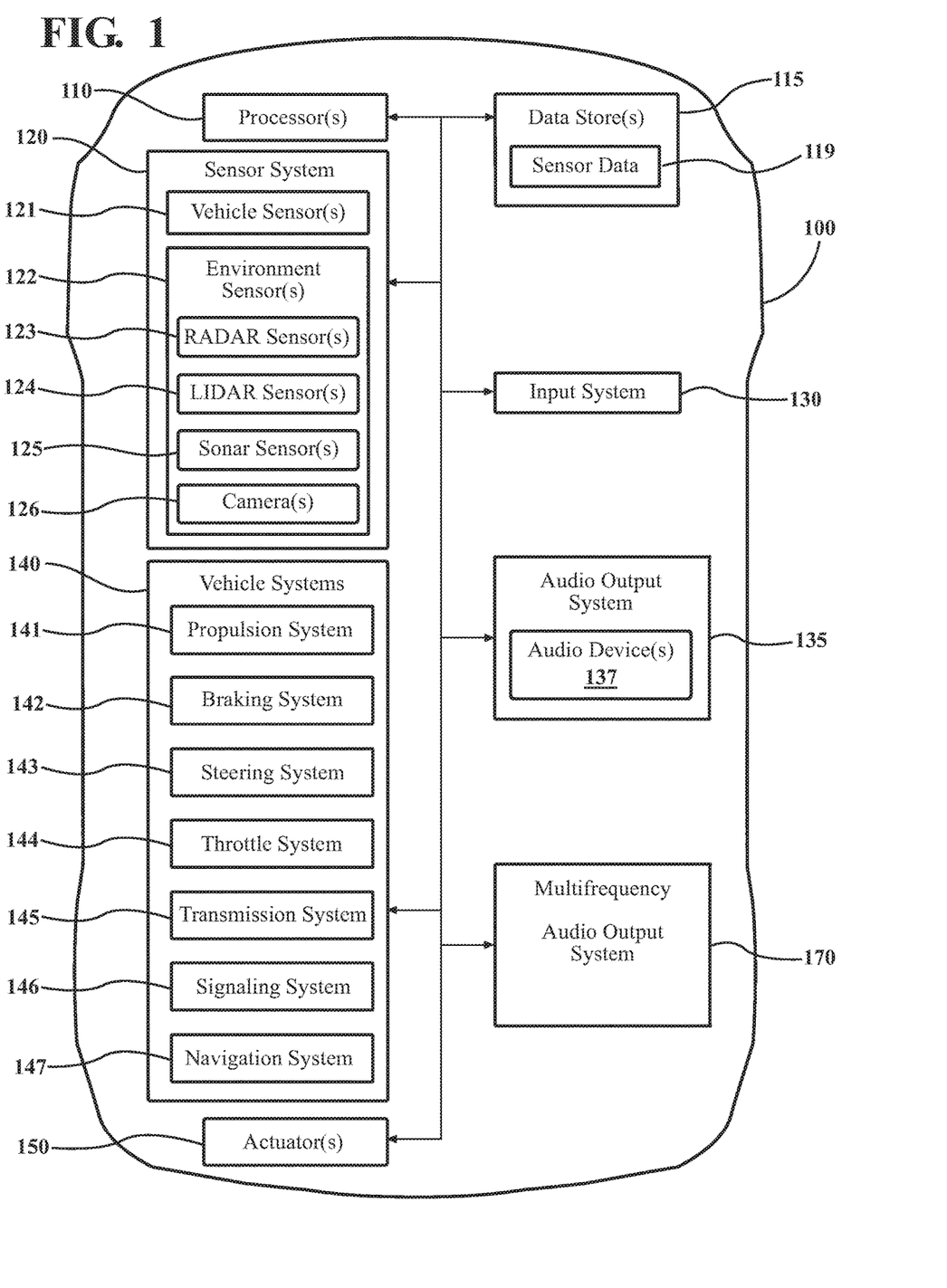
FIG. 1 illustrates one embodiment of a vehicle within which systems and methods disclosed herein may be implemented.

Referring to FIG. 1, an example of a vehicle 100 is illustrated. As used herein, a "vehicle" is any form of powered transport. In some implementations, the vehicle 100 is an automobile. The vehicle 100 may be manually driven, semi-autonomous or fully autonomous. While arrangements will be described herein with respect to automobiles, it will be understood that embodiments are not limited to automobiles. In some implementations, the vehicle 100 may be any robotic device or form of powered transport that, for example, includes one or more automated or autonomous systems, and thus benefits from the functionality discussed herein.

The vehicle 100 includes a sensor system 120, an audio output system 135, and a multifrequency audio output system 170. The vehicle 100 also includes other elements, as shown in FIG. 1. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances and provided as remote services (e.g., cloud-computing services).

The sensor system 120 may include one or more sensors. "Sensor" means any device, component and/or system that can detect, determine, assess, monitor, measure, quantify and/or sense something. The one or more sensors can be configured to detect, determine, assess, monitor, measure, quantify and/or sense in real-time. As used herein, the term "real-time" means a level of processing responsiveness that a passenger or system senses as sufficiently immediate for a particular process or determination to be made or that enables a processor 110 to keep up with some external process. In arrangements in which there are a plurality of sensors, the sensors can work independently from one another. Alternatively, two or more of the sensors can work in combination with one another. In such case, the two or more sensors can form a sensor network. The sensors can be operatively connected to the multifrequency audio output system 170 or other elements of the vehicle 100 (including any of the elements shown in FIG. 1). The sensors can include any suitable type of sensor. The sensors may be internal to the vehicle. Additionally or alternatively, some sensors may be external to the vehicle 100. Various examples of different types of sensors will be described herein. However, it will be understood that the embodiments are not limited to the particular sensors described.

The sensor system 120 may be configured to monitor at least one passenger and determine whether the at least one passenger responds to audio signals. The sensor system 120 may monitor the at least one passenger using one or a combination of various sensors. As an example, the sensor system 120 can include one or more cameras 126. In one or more arrangements, the camera(s) 126 can be configured to monitor and/or track one or more passengers, inside or outside of the vehicle. The camera(s) 126 may acquire sensor data in various forms such as still images, video, point clouds, and so on.

In one or more arrangements, the sensor system 120 may include artificial or computational intelligence elements, e.g., neural network, fuzzy logic, or other machine learning algorithms. As one example, the sensor system 120 may use machine learning techniques to interpret the passenger's response. As another example, the sensor system 120 may include an action identification database that identifies various actions taken by a passenger. In such an example, the sensor system 120 may compare the passenger's actions received from the various sensors to the various actions stored in the action identification database to interpret the passenger's response.

The vehicle 100 can include an audio output system 135. An "audio output system" includes any device, component, arrangement, or group thereof that enables audible information/data to be presented to any user (e.g., a driver, a passenger, any other occupants, or any person proximate to the vehicle). The audio output system 135 in the vehicle 100 may include a plurality of audio devices 137 such as audio devices 137 on which the audio output system 135 outputs audio information. The audio device(s) 137 may configured to output audio signals at a plurality of frequencies. In one embodiment, each audio device 137 may be capable of outputting a plurality of frequencies, ranging from a predetermined minimum frequency to a predetermined maximum frequency. In another embodiment, the audio devices 137 may be divided into groups with each group being capable of outputting a different frequency range.

The audio output system 135 may output an audio signal at multiple frequencies at substantially the same time. In one embodiment, the audio output system 135 may output audio signals on different audio devices 137 (e.g., speakers) at different frequencies within a relatively short time period. In another embodiment, the audio output system 135 may use one audio device 137 (that is capable of outputting audio signals at multiple frequencies) to output an audio signal at multiple frequencies sequentially within a relatively short period of time. The rate at which the plurality of frequencies are output in the relatively short time period may be such that any delay between the frequencies may be indistinguishable to a human ear.

The audio devices 137 may located at any suitable locations inside or outside of the vehicle 100. As an example, an audio device 137 may be located in a vehicle seat, on the dashboard and/or on the exterior body of the vehicle.

Some of the possible elements of the vehicle 100 are shown in FIG. 1 and will be described along with subsequent figures. However, a description of many of the elements in FIG. 1 will be provided after the discussion of FIGS. 2-4 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. It should be understood that the embodiments described herein may be practiced using various combinations of these elements.

In an embodiment, the vehicle 100 includes a multifrequency audio output system 170 that provides audio information in a vehicle. Though depicted as a standalone component, in one or more embodiments, the multifrequency audio output system 170 may be integrated with a component of the vehicle 100. The noted functions and methods will become more apparent with a further discussion of the figures.

Figure 2:
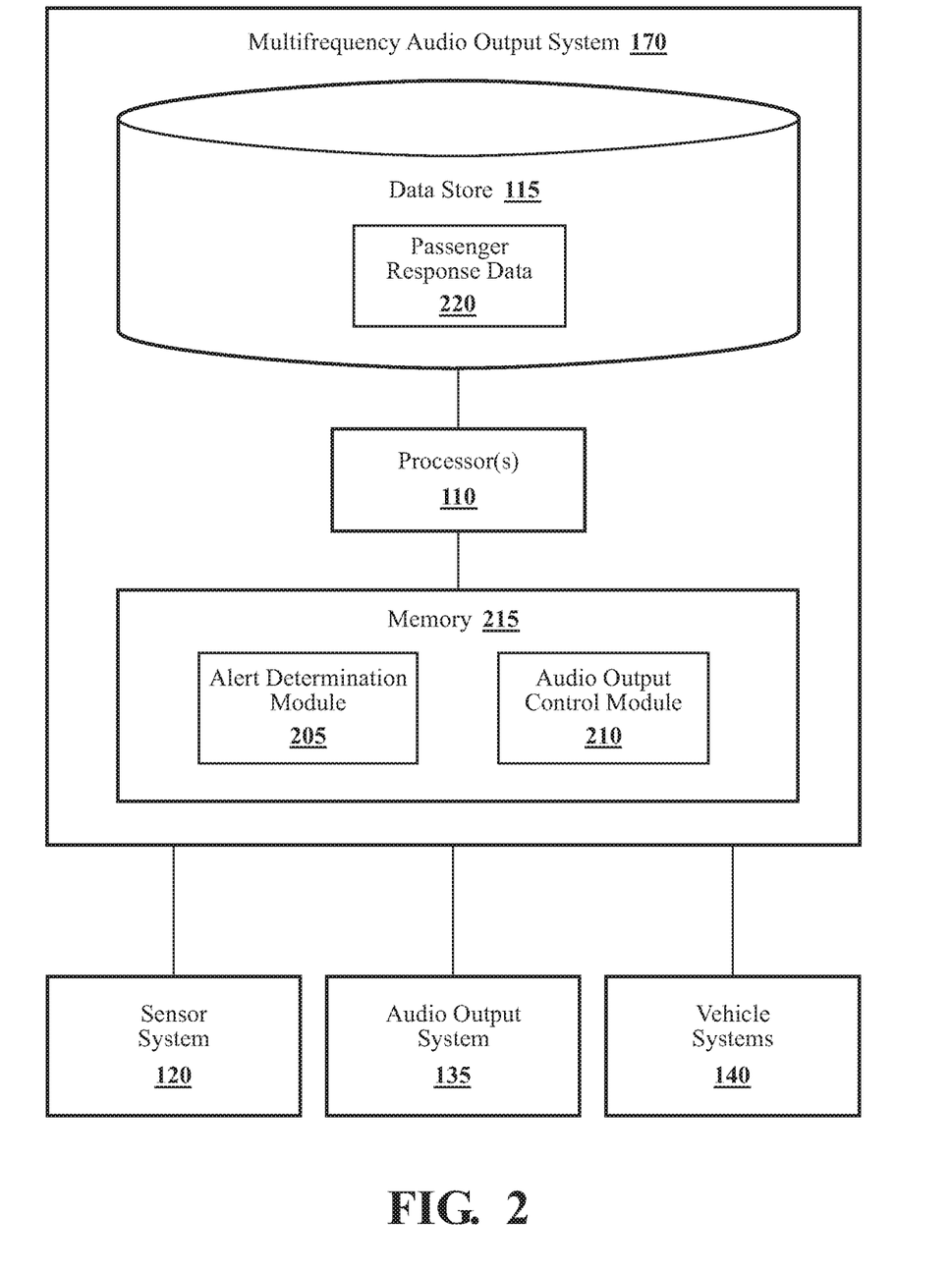
FIG. 2 illustrates one embodiment of a multifrequency audio output system that is associated with providing audio information in a vehicle.

With reference to FIG. 2, one embodiment of the multifrequency audio output system 170 is further illustrated. As shown, the multifrequency audio output system 170 includes a processor 110. Accordingly, the processor 110 may be a part of the multifrequency audio output system 170 or the multifrequency audio output system 170 may access the processor 110 through a data bus or another communication path. In one or more embodiments, the processor 110 is an application specific integrated circuit (ASIC) that is configured to implement functions associated with an alert determination module 205 and an audio output control module 210. In general, the processor 110 is an electronic processor such as a microprocessor that is capable of performing various functions as described herein.

In one embodiment, the multifrequency audio output system 170 includes a memory 215 that is communicably coupled to the processor 110. The memory 215 stores the alert determination module 205 and the audio output control module 210. The memory 215 is a random-access memory (RAM), read-only memory (ROM), a hard disk drive, a flash memory, or other suitable memory for storing the alert determination module 205 and the audio output control module 210. The alert determination module 205 and the audio output control module 210 are, for example, computer-readable instructions that when executed by the processor 110 cause the processor 110 to perform the various functions disclosed herein.

Furthermore, in one embodiment, the multifrequency audio output system 170 may include a data store 115. The data store 115 may be a component of the multifrequency audio output system 170, the processor(s) 110, or both. Alternatively, the data store 115 may be a component of the vehicle 100, as shown FIG. 1, and can be operatively connected to the multifrequency audio output system 170 or the processor(s) 110. The term "operatively connected," as used throughout this description, can include direct or indirect connections, including connections without direct physical contact.

In one embodiment, the data store 115 may be an electronic data structure such as a database that is stored in the memory 215 or another memory and that is configured with routines that can be executed by the processor 110 for analyzing stored data, providing stored data, organizing stored data, and so on. Thus, in one embodiment, the data store 115 stores data used by the alert determination module 205 and the audio output control module 210 in executing various functions. In one embodiment, the data store 115 includes passenger response data 220 along with, for example, other information that is used by the alert determination module 205 and the audio output control module 210.

In one embodiment, the multifrequency audio output system 170 determines whether any passenger has a hearing impairment before outputting the audio signal at multiple frequencies. In such an embodiment, the multifrequency audio output system 170 outputs an audio signal at a single frequency, the sensor system 120 detects and records the passenger's response, the multifrequency audio output system 170 receives data relating to the passenger's response, and based on the passenger's response, the multifrequency audio output system 170 outputs the audio signal at multiple frequencies. The sensor system 120 includes vehicle sensors 121 and environment sensors 122. The sensors 121, 122 detect the passenger's actions and events occurring inside or near the vehicle 100, and store data related to the detected actions and events as sensor data 119 in the data store 115. The sensor data 119 includes the passenger response data 220, which relates to the detected passenger's actions. For example, the camera 126 may detect the passenger looking over at the passenger's blind spot and the camera 126 may include data relating to that passenger action in the passenger response data 220, stored in the data store 115.

The alert determination module 205 generally includes instructions that function to control the processor 110 to determine whether at least one vehicle alert is to be provided by the vehicle 100, or more specifically, by the sensor system 120 or a vehicle system 140. The vehicle alert can be any form of notification issued by the sensor system 120 or the vehicle system 140 to inform the passenger of an event or issue. As an example, a vehicle sensor 121 (such as a vehicle door sensor) may issue a vehicle alert when the vehicle 100 is in motion and at least one of the vehicle doors is not properly closed. As another example, one of the vehicle systems 140 (e.g., the braking system 142) may issue a vehicle alert when the vehicle brake is engaged but the vehicle 100 is not stopping in response because the surface of the road is slippery. The braking system 142 may issue a vehicle alert by outputting a signal such as an electronic signal that may trigger the audio output system 135 and/or the multifrequency audio output system 170 to output an audible signal.

The alert determination module 205 may receive the signal related to a vehicle alert by passively sniffing the data inputs from a stream of electronic information provided by the sensor system 120 or the vehicle systems 140 to further components within the vehicle 100. Alternatively, the alert determination module 205 may actively request or poll the sensor system 120 and various vehicle systems 140 for data inputs.

Upon receiving a signal related to a vehicle alert, the alert determination module 205 may indicate to the audio output control module 210 that a vehicle alert has been issued. Based on receiving that indication, the audio output control module 210 may activate the audio device(s) 137 to output an audio signal for the vehicle alert. The audio device 137 may output the audio signal at multiple frequencies, ranging from a predetermined minimum frequency value to a predetermined maximum frequency value. As an example, the predetermined minimum frequency may be set to 20 Hz and the predetermined maximum frequency may be set to 20 kHz, as the audible frequency range for humans is generally 20 Hz to 20 kHz. However, in other embodiments, the predetermined minimum frequency may be set to a higher or a lower frequency than 20 Hz and the predetermined maximum frequency may be set to a higher or a lower frequency than 20 kHz.

The multiple frequencies (collectively known as a frequency range) may include any suitable number of frequencies. As an example, the frequency range may include 11 frequencies—20 Hz, 2 kHz, 4 kHz, 6 kHz, 8 kHz, 10 kHz, 12 kHz, 14 kHz, 16 kHz, 18 kHz, and 20 kHz. The difference between each two frequencies may be fairly evenly distributed or may be unevenly distributed. In some embodiments, the frequencies may be concentrated at the minimum end of the frequency range. As an example, the frequency range may include 9 frequencies—20 Hz, 500 Hz, 1 kHz, 1.5 kHz, 2 kHz, 2.2 kHz, 4 kHz, 7 kHz and 12 kHz. Alternatively, the frequencies may be concentrated at the maximum end of the frequency range, the middle of the frequency range or may be randomly distributed throughout the frequency range.

In one embodiment, the audio output control module 210 may activate the audio devices 137 to output the audio signal at the plurality of frequencies at substantially the same time. Substantially the same time, in this case, may or may not be instantaneous. In other words, the audio signal may be output at multiple frequencies within a relatively short period of time. For example, the audio output control module 210 may activate each of nine audio devices 137 to output the audio signal at a different frequency within the short period of time (with T1 being the earliest time and T4 being the latest time), as shown in Table 1 below.

TABLE 1

| Time | T1 | T2 | T1 | T2 | T3 | T3 | T1 | T4 | T2 |
|---|---|---|---|---|---|---|---|---|---|
| Audio device (AD) | AD1 | AD2 | AD3 | AD4 | AD5 | AD6 | AD7 | AD8 | AD9 |
| Output Frequency | 40 Hz | 1 kHz | 2 kHz | 4 kHz | 5 kHz | 7 kHz | 8 kHz | 10 kHz | 16 kHz |

In another embodiment, the audio output control module 210 may activate one audio device 137 to output the audio signal at the plurality of frequencies over a predetermined period of time in a sequential manner. The period of time may range from being substantially small such that a delay in the audio output would be indistinguishable to a human ear to being large enough that the delay between frequencies is distinguishable to the human ear. In other words, the audio output control module 210 may activate a single audio device 137 to output different frequencies at different times (with T1 being the earliest time and T9 being the latest time) as shown in the Table 2 below.

TABLE 2

| Time | T1 | T2 | T3 | T4 | T5 | T6 | T7 | T8 | T9 |
|---|---|---|---|---|---|---|---|---|---|
| Output Frequency | 100 Hz | 2 kHz | 3 kHz | 4.1 kHz | 5 kHz | 6 kHz | 9 kHz | 12 kHz | 14 kHz |

In this embodiment, the audio output control module 210 activates the audio device 137 to output the audio signal in a sequential manner, beginning at the predetermined minimum frequency and ending at the predetermined maximum frequency. Alternatively, the audio output control module 210 may output the audio signal in a sequential manner, beginning at the predetermined maximum frequency and ending at the predetermined minimum frequency. In another embodiment, the audio output control module 210 may activate multiple audio devices 137 such that each audio device outputs the audio signal at multiple frequencies over a predetermined period of time in a sequential manner. In other words, the audio output control module 210 may determine which of the audio devices 137 output the audio signal. Further, the audio output control module 210 may select one of the audio devices 137 to output the signal, and determine at which frequencies and for how long the selected audio device 137 output the audio signal.

In yet another embodiment, the multifrequency audio output system 170 may determine whether at least one passenger has a hearing impairment, and if so, the multifrequency audio output system 170 may activate the audio device 137 to output the audio signal at multiple frequencies. In such an embodiment, the audio output control module 210 may activate the audio device 137 to output, in response to receiving an indication of a vehicle alert from the alert determination module 205, the audio signal at a single predetermined frequency. The single predetermined frequency may be set to a frequency value that is generally heard by a majority of passengers (e.g., occupants of the vehicle and non-occupants near the vehicle). While the audio device 137 outputs the audio signal at the predetermined frequency, the sensor system 120 may detect the passenger's response to the outputted audio signal. For example, a camera 126 inside the vehicle 100 may record the passenger's reaction to the audio signal to monitor for an expected movement in response to the audio signal. As another example, in a case where the audio signal indicates that the passenger should press a button, the sensor system 120 or any suitable vehicle system 140 may determine whether the passenger pressed the button. When the multifrequency audio output system 170 determines that the passenger did not respond to the audio signal as expected (e.g., did not perform an expected movement or press a button), the audio output control module 210 may determine that the passenger did not hear the audio signal at the predetermined frequency. Accordingly, the audio output control module 210 may activate the audio device 137 to output, in response to receiving an indication of a vehicle alert from the alert determination module 205, the audio signal at multiple frequencies as explained above.

Figure 3:
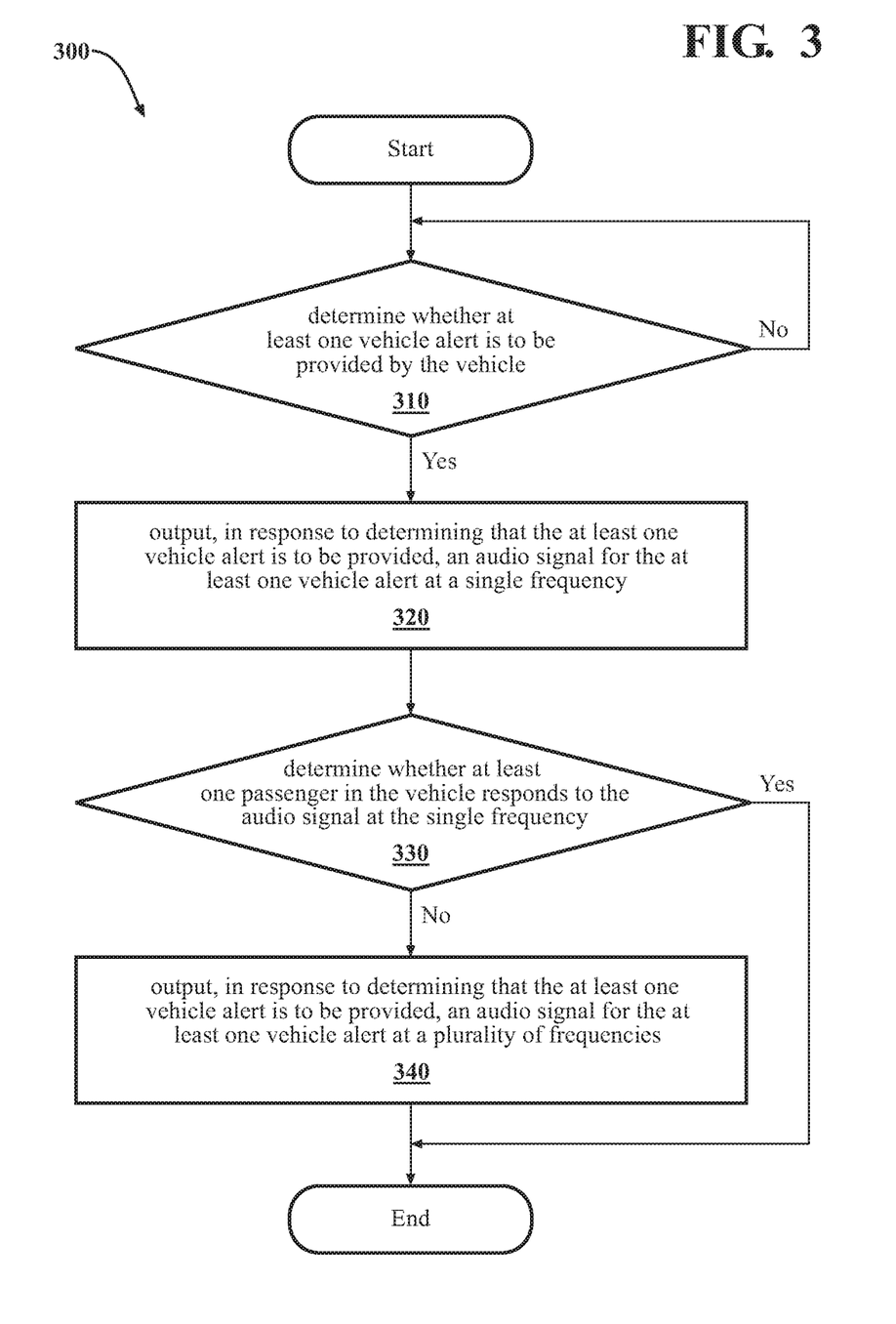
FIG. 3 is a flowchart illustrating one embodiment of a method associated with providing audio information in a vehicle.

FIG. 3 illustrates a flowchart of a process 300 that is associated with providing audio information in a vehicle 100. Process 300 will be discussed from the perspective of the multifrequency audio output system 170 of FIGS. 1-2. While process 300 is discussed in combination with the multifrequency audio output system 170, it should be appreciated that the process 300 is not limited to being implemented within the multifrequency audio output system 170 but is instead one example of a system that may implement the process 300.

At 310, the alert determination module 205 determines whether a vehicle alert is to be provided by the vehicle 100. As previously mentioned, the alert determination module 205 may receive at least one vehicle alert from the sensor system 120 or a vehicle system 140 such as navigation system 147. As an example, the vehicle system 140 may issue a vehicle alert by outputting a signal such as an electronic signal that may trigger the audio output system 135 and/or the multifrequency audio output system 170 to output an audible signal. As another example, the alert determination module 205 may receive the signal related to the vehicle alert by passively sniffing data inputs from a stream of electronic information provided by the various sensor and vehicle systems to further components within the vehicle 100. As another example, the alert determination module 205 may actively request and/or poll various sensor and vehicle systems for data inputs. Upon receiving the vehicle alert, the alert determination module 205 sends a signal to the audio output control module, indicating that a vehicle alert has been issued.

When the audio output control module 210 receives the signal from the alert determination module 205, the process 300 proceeds to block 320, where the audio output control module 210 determines whether a passenger has a hearing impairment such that if the passenger has a hearing impairment, the audio output control module 210 may output the audio signal at multiple frequencies. In another embodiment, the audio output control module 210 may not determine whether a passenger has a hearing impairment and the process 300 may proceed to block 340.

At 320, so as to determine whether a passenger has a hearing impairment, the audio output control module 210 may output, in response to receiving an indication of a vehicle alert from the alert determination module 205, an audio signal at a single frequency. The audio output control module 210 may arbitrarily select a default frequency value within the range generally audible to the human ear, and may output a signal to the audio output system 135 to output an audio signal at the default frequency on one or more audio devices 137.

At 330, the audio output control module 210 may determine whether at least one passenger in the vehicle 100 responds to the audio signal at the single frequency. The audio output control module 210 may make the determination based on receive passenger response data 220 (i.e., data relating to the passenger's reaction). The audio output control module 210 activates various sensors such as a camera 126 to observe and record the passenger's reaction, which may be stored as passenger response data 220 in the data store 115. The audio output control module 210 may identify the passenger's reaction using machine learning algorithms or any suitable programs. For example, if the vehicle alert related to the audio signal outputted indicated an object in a passenger's blind spot and the camera 126 records the passenger turning towards the blind spot, the audio output control module 210 may determine that the passenger is able to hear audio signals at the default frequency. However, the audio output control module 210 may require multiple observations of the passenger's reactions before determining that the passenger is able to hear audio signals at the default frequency. In another example, the audio output control module 210 may output an audio signal relating to a vehicle alert at the default frequency and then, the audio output control module 210 may detect whether the issue relating to the vehicle alert was resolved. For example, the issue may be that the parking brake is engaged, while the vehicle 100 is in motion. In such an example, if the audio output control module 210 outputs an audio signal at the default frequency indicating that the parking brake is engaged and then receives data from the braking system 142, indicating that the parking brake has been disengaged, the audio output control module 210 may determine, after a series of similar tests, that the audio signal at the default frequency is audible to the passenger.

When the audio output control module 210 determines that the passenger does not appear to respond to the outputted audio signal, the audio output control module 210 may output the audio signal for the vehicle alert at multiple frequencies as described below.

At 340, the audio output control module 210 outputs, in response to receiving an indication of a vehicle alert from the alert determination module 205, an audio signal for the vehicle alert at multiple frequencies. In other words, the audio output control module 210 may output a signal to the audio output system 135, activating the audio output system 135 to output an audio signal at multiple frequencies.

As previously mentioned, the audio output system 135 may include multiple audio devices 137. In one case, the audio output control module 210 may output a signal to the audio output system 135, indicating that the audio output system 135 output an audio signal on different audio devices 137 at different frequencies. For example, for an audio output system 135 that includes eight audio devices 137, the audio output control module 210 may indicate that each of the eight audio devices 137 output the audio signal at a different frequency, totaling eight different frequencies. Alternatively and as another example, the audio output control module 210 may indicate that each of the eight audio devices 137 output the audio signal at two different frequencies in a sequential manner, totaling sixteen different frequencies.

In another case, the audio output control module 210 may output a signal to the audio output system 135, indicating that the audio output system 135 output an audio signal at different frequencies on a single audio device 137. In such a case, the audio output system 135 may include a single audio device 137 or it may include a plurality of audio devices 137. As an example of an audio output system 135 having a single audio device 137, the audio output control module 210 may output a signal to the audio output system 135 indicating that the audio output system 135 output the audio signal on the single audio device 137 at multiple different frequencies in sequence, with a predetermined delay between each two frequencies (e.g., at 1 s, 1 KHz; at 2 s, 5 KHz; at 3 s, 10 KHz; at 4, 15 KHz). As an example of an audio output system 135 having a plurality of audio devices 137, the audio output control module 210 may output a signal to the audio output system 135 indicating that the audio output system 135 output the audio signal on each of the plurality of audio devices 137 at multiple different frequencies in sequence with a predetermined delay between each two frequencies. However, even though each audio device 137 may output the audio signal sequentially, the plurality of audio devices 137 may output at the same time. In other words, the plurality of audio devices 137 may output the audio signal at different frequencies in unison or not, as illustrated by the example in Table 3 below.

TABLE 3

|      | 1 s      | 2 s      | 3 s      | 4 s      | 5 s    | 6 s      |
|------|----------|----------|----------|----------|--------|----------|
| AD 1 | —        | 400 Hz   | —        | 1 KHz    | 3 KHz  | —        |
| AD 2 | 5.2 KHz  | —        | 8.8 KHz  | —        | —      | 10.2 KHz |
| AD 3 | 11.6 KHz | 12.2 KHz | 12.8 KHz | 13.3 KHz | —      | 14.9 KHz |
| AD 4 | 15.1 KHz | 15.8 KHz | 17.4 KHz | 17.8 KHz | —      | 18.2 KHz |

As shown in Table 3 above, the audio devices 137 may output the audio signal at different frequencies in unison (e.g., AD3 and AD4) or the audio devices 137 may not (e.g., AD1 and AD2).

The audio output control module 210 may determine which frequencies to output based on suitable statistics that identify which frequencies majority of passengers are most likely to hear. Alternatively, the audio output control module 210 may determine a range of frequencies based on what is generally audible to the human ear. Upon determining the range, the audio output control module 210 may consider various factors such as the number of audio devices 137 in the audio output system 135, the location of the audio devices 137 in the vehicle 100, the frequency capability of the audio devices 137, the type (and the urgency) of vehicle alert, the time within which the output of the audio signal must be completed, etc. On the other hand, the audio output control module 210 may arbitrarily select multiple frequencies within the range.

The audio output control module 210 may determine that the frequencies be output at substantially the same time by indicating to the audio output system 135 to output different frequencies on different audio devices 137 within a short time period. The short time period may be short enough that any delay within the output at the different frequencies is indistinguishable to the human ear.

The audio output control module 210 may determine that the frequencies be output in sequence. The sequence may be random, that is, the frequency values may not have any relationship with the time (i.e., the frequency values may not increase or decrease with time). Alternatively, the sequence may have a relationship with time such that the frequencies are output from a minimum frequency value to a maximum frequency or from a maximum frequency value to a minimum frequency value, each relative to time.

In one embodiment, the audio output control module 210 may activate the audio output system 135 to output the audio signal at multiple frequencies without any input from a passenger. In another embodiment, the audio output control module 210 may output the audio signal at multiple frequencies based on input from at least one passenger. In such an embodiment, the audio output control module 210 may initially determine whether a passenger has a hearing impairment.

Figure 4A:
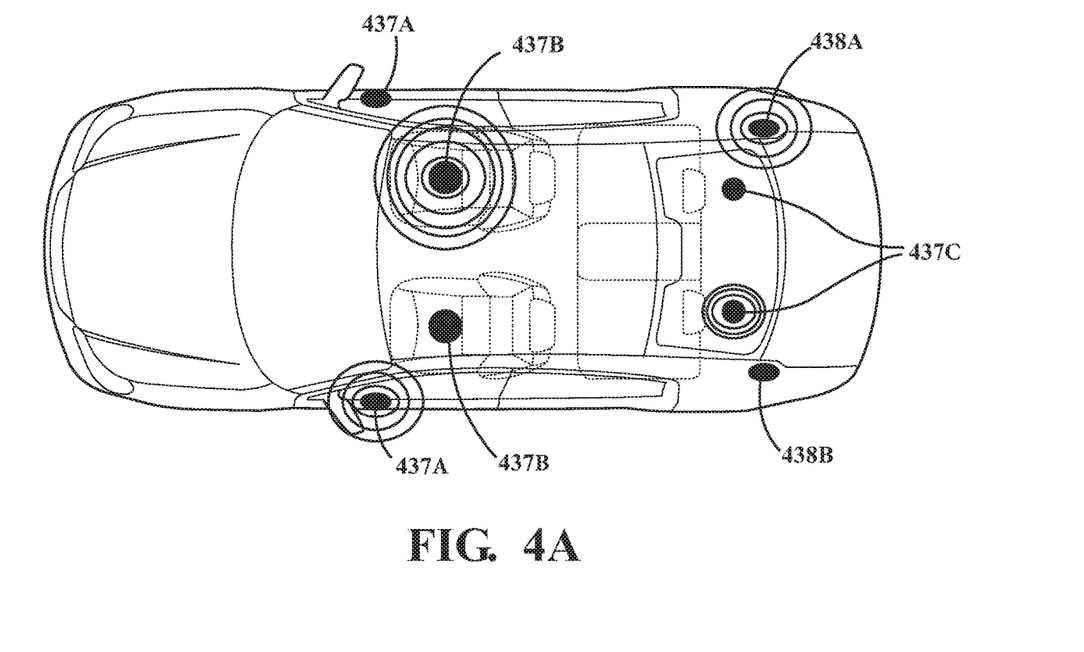
FIGS. 4A-4B illustrate example scenarios where the disclosed approach may output audio signals at a plurality of frequencies.
Figure 4B:
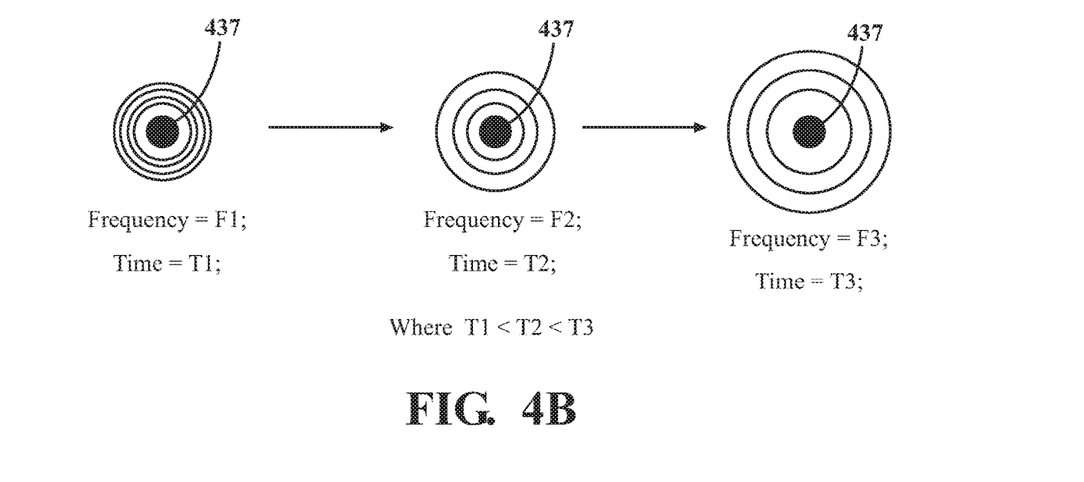

FIGS. 4A-4B illustrate example scenarios involving one or more audio devices 137 outputting an audio signal at a plurality of frequencies. The audio devices 137 such as internal speakers 437A, 437B, 437C (collectively known as 437) and external speakers 438A, 438B (collectively known as 438) may be situated at various locations within the vehicle 100.

FIG. 4A illustrates the placement of speakers 437, 438 within the vehicle 100. As shown, the vehicle 100 may include internal speakers 437, which may located in the seats, doors or any other suitable location inside the vehicle 100. The vehicle 100 may also include external speakers 438 located on the exterior of the vehicle 100. Further, in FIG. 4A, one or more speakers 437 output an audio signal at substantially the same time, but each at a different frequency. In this case, the audio output control module 210 may output a signal to the audio output system 135, activating the audio output system 135 to output an audio signal at a different frequency on one or more speakers 437, 438.

FIG. 4B illustrates an example scenario where a single internal speaker 437 outputs different frequencies F1, F2, F3 (shown as concentric circles of different sizes) at varying times, T1, T2, T3, where T1 is the earliest time, T3 is the latest time, and T2 is between T1 and T3. In this case, the audio output control module 210 may output a signal to the audio output system 135, activating the audio output system 135 to output on a specified speaker 437 a first frequency F1 at time T1, a second frequency F2 at time T2 and a third frequency F3 at time T3. As another example, multiple speakers 437A, 437B, 437C may output the audio signal at varying times, i.e., the internal speaker 437A may output a first frequency F1 at time T1, the internal speaker 437B may output a second frequency F2 at time T2, and the internal speaker 437C may output a third frequency F3 at time T3.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner. "Manual mode" means that all of or a majority of the navigation and/or maneuvering of the vehicle 100 is performed according to inputs received from a user (e.g., human driver).

"Autonomous mode" refers to navigating and/or maneuvering the vehicle 100 along a travel route using one or more computing systems to control the vehicle 100 with minimal or no input from a human driver.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the sensor data 119 can be located in one or more data stores 115 located onboard the vehicle 100. Alternatively, or in addition, at least a portion of the sensor data 119 can be located in one or more data stores 115 that are located remotely from the vehicle 100.

As noted above, the vehicle 100 can include the sensor system 120. The sensor system 120 can include one or more sensors. "Sensor" means any device, component, or system that can detect or sense something. The one or more sensors can be configured to detect or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, or sense information about the vehicle 100 itself. In one or more arrangements, the vehicle sensor(s) 121 can be configured to detect, or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, or other suitable sensors. The vehicle sensor(s) 121 can be configured to detect or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire or sense environment data. Environment data may include internal environment data and driving environment data. "Internal environment data" includes data or information about inside the vehicle 100, e.g., in the vehicle cabin. For example, the one or more environment sensors 122 can be configured to detect, quantify, or sense an occupant in the vehicle 100 and any actions the occupant takes.

"Driving environment data" includes data or information about the external environment in which an autonomous vehicle is located or one or more portions thereof. For example, the one or more environment sensors 122 can be configured to detect, quantify, or sense obstacles in at least a portion of the external environment of the vehicle 100 and/or information/data about such obstacles. Such obstacles may be stationary objects and/or dynamic objects.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110. Any suitable actuator can be used. For instance, the one or more actuators 150 can include motors, pneumatic actuators, hydraulic pistons, relays, solenoids, and/or piezoelectric actuators, just to name a few possibilities.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, module as used herein includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A method for providing audio information in a vehicle, the method comprising:
   determining whether at least one vehicle alert is to be provided by the vehicle; and
   outputting, in response to determining that the at least one vehicle alert is to be provided, an audio signal for the at least one vehicle alert at a plurality of frequencies, wherein the plurality of frequencies range from a predetermined minimum frequency value to a predetermined maximum frequency value;
   outputting, in response to determining that the at least one vehicle alert is to be provided, the audio signal at a single frequency; and
   determining whether at least one passenger in the vehicle appears to respond to the audio signal at the single frequency, wherein outputting the audio signal at the plurality of frequencies is performed when the at least one passenger does not appear to respond to the audio signal at the single frequency.

2. The method in claim 1, wherein outputting the audio signal at the plurality of frequencies includes outputting the audio signal at the plurality of frequencies at substantially the same time.

3. The method of claim 1, wherein outputting the audio signal at the plurality of frequencies includes outputting the audio signal at the plurality of frequencies over a predetermined period of time in a sequential manner.

4. The method of claim 3, wherein the sequential manner begins at the predetermined minimum frequency value and ends at the predetermined maximum frequency value.

5. The method of claim 3, wherein the sequential manner begins at the predetermined maximum frequency value and ends at the predetermined minimum frequency value.

6. A system for providing audio information in a vehicle, the system comprising:
   one or more audio devices;
   one or more processors;
   a memory communicably coupled to the one or more processors and storing:
      an alert determination module including instructions that when executed by the one or more processors cause the one or more processors to determine whether at least one vehicle alert is to be provided by the vehicle; and an audio output control module including instructions that when executed by the one or more processors cause the one or more processors to output, in response to determining that the at least one vehicle alert is to be provided, an audio signal for the at least one vehicle alert at a plurality of frequencies via the one or more audio devices, wherein the plurality of frequencies ranges from a predetermined minimum frequency value to a predetermined maximum frequency value; and a sensor operable to determine whether at least one passenger in the vehicle responds to the audio signal;

wherein the audio output control module further includes instructions to output, in response to determining that the at least one vehicle alert is to be provided, the audio signal at a single frequency via the one or more audio devices; and wherein the instructions to output the audio signal at the plurality of frequencies further include instructions to output, in response to determining that the at least one vehicle alert is to be provided, the audio signal at the plurality of frequencies when the at least one passenger does not respond to the audio signal.

7. The system of claim 6, wherein the instructions to output the audio signal at the plurality of frequencies further include instructions to output the audio signal at the plurality of frequencies at substantially the same time.

8. The system of claim 6, wherein the instructions to output the audio signal at the plurality of frequencies further include instructions to output the audio signal at the plurality of frequencies over a predetermined period of time in a sequential manner.

9. The system of claim 8, wherein the sequential manner begins at the predetermined minimum frequency value and ends at the predetermined maximum frequency value.

10. The system of claim 8, wherein the sequential manner begins at the predetermined maximum frequency value and ends at the predetermined minimum frequency value.

11. The system of claim 6, wherein the audio output control module further includes instructions to determine which of the one or more audio devices to output the audio signal.

12. The system of claim 6, wherein the audio output control module further includes instructions to:

select one of the one or more audio devices to output the signal;

determine at which of the plurality of frequencies the selected audio device output the audio signal; and determine how long the selected audio device output the audio signal.

13. A non-transitory computer-readable medium for providing audio information in a vehicle and including instructions that when executed by one or more processors cause the one or more processors to:

determine whether at least one vehicle alert is to be provided by the vehicle; and output, in response to determining that the at least one vehicle alert is to be provided, an audio signal for the at least one vehicle alert at a plurality of frequencies, wherein the plurality of frequencies ranges from a predetermined minimum frequency value to a predetermined maximum frequency value;

output, in response to determining that the at least one vehicle alert is to be provided, the audio signal at a single frequency;

determine whether at least one passenger in the vehicle responds to the audio signal at the single frequency; and wherein the instructions to output the audio signal at the plurality of frequencies further include instructions to output the audio signal at the plurality of frequencies when the at least one passenger does not respond to the audio signal at the single frequency;

when the at least one passenger does not respond to the audio signal at the single frequency.

14. The non-transitory computer-readable medium of claim 13, wherein the instructions further include instructions to output the audio signal at the plurality of frequencies at substantially the same time.

15. The non-transitory computer-readable medium of claim 13, wherein the instructions further include instructions to output the audio signal at the plurality of frequencies over a predetermined period of time in a sequential manner.

16. The non-transitory computer-readable medium of claim 15, wherein the sequential manner begins at the predetermined minimum frequency value and ends at the predetermined maximum frequency value.

17. The non-transitory computer-readable medium of claim 15, wherein the sequential manner begins at the predetermined maximum frequency value and ends at the predetermined minimum frequency value.

* * * * *